US009408159B2

(12) United States Patent
Lee et al.

(10) Patent No.: US 9,408,159 B2
(45) Date of Patent: Aug. 2, 2016

(54) METHOD AND APPARATUS FOR PERFORMING TRANSMIT (TX) POWER CONTROL IN CONVERGENCE NETWORK OF PLURAL COMMUNICATION SYSTEMS

(71) Applicant: LG ELECTRONICS INC., Seoul (KR)

(72) Inventors: Eunjong Lee, Seoul (KR); Hyunsoo Ko, Seoul (KR); Hyeyoung Choi, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/766,366

(22) PCT Filed: Feb. 5, 2014

(86) PCT No.: PCT/KR2014/000973
§ 371 (c)(1),
(2) Date: Aug. 6, 2015

(87) PCT Pub. No.: WO2014/126354
PCT Pub. Date: Aug. 21, 2014

(65) Prior Publication Data
US 2015/0382306 A1 Dec. 31, 2015

Related U.S. Application Data

(60) Provisional application No. 61/765,046, filed on Feb. 15, 2013.

(51) Int. Cl.
*H04W 52/24* (2009.01)
*H04W 52/36* (2009.01)
(Continued)

(52) U.S. Cl.
CPC ........ *H04W 52/244* (2013.01); *H04W 52/0206* (2013.01); *H04W 52/34* (2013.01); *H04W 52/367* (2013.01); *H04W 52/243* (2013.01)

(58) Field of Classification Search
CPC ............................ H04W 52/244; H04W 52/34
USPC ......... 455/522, 69, 452.2, 452.1, 63.1, 67.11, 455/67.13
See application file for complete search history.

(56) References Cited

U.S. PATENT DOCUMENTS

| 9,020,455 B1* | 4/2015 | Khlat ......................... 455/127.1 |
| 2003/0119452 A1* | 6/2003 | Kim .................... H04W 52/143 455/69 |

(Continued)

FOREIGN PATENT DOCUMENTS

| JP | 2012-231487 A | 11/2012 |
| JP | 2012-244378 A | 12/2012 |

(Continued)

OTHER PUBLICATIONS

International Search Report from PCT/KR2014/000973, dated Jun. 26, 2014.
(Continued)

*Primary Examiner* — John J Lee
(74) *Attorney, Agent, or Firm* — Dentons US LLP

(57) ABSTRACT

A method and apparatus for performing transmit (Tx) power control in a convergence network of a plurality of communication systems. A method for performing transmit power control (TPC) in a plurality of communication system convergence networks includes receiving, by a first entity of a first communication system, a TPC information request message requesting information associated with transmit power control (TPC) from a second entity of a second communication system; upon receiving a request of the TPC information request message, transmitting a first TPC information reporting message, which includes a maximum transmit (Tx) power value of the first entity and an interference signal value caused by a neighbor entity of the first entity, to the second entity; receiving a TPC command message, which includes information of the maximum Tx power value of the first entity adjusted based on the maximum Tx power value of the first entity and the interference signal value, from the second entity; and adjusting the maximum Tx power value of the first entity based on the information regarding the adjusted maximum Tx power of the first entity.

13 Claims, 25 Drawing Sheets

(51) Int. Cl.
*H04W 52/02* (2009.01)
*H04W 52/34* (2009.01)

(56) References Cited

U.S. PATENT DOCUMENTS

2005/0059422 A1* 3/2005 Rudolf .................. H04L 12/24
 455/522
2014/0335909 A1* 11/2014 Czerepinski .......... H04W 52/40
 455/522

FOREIGN PATENT DOCUMENTS

KR 10-2009-0115217 A 11/2009
KR 10-2013-0016241 A 2/2013

OTHER PUBLICATIONS

Written Opinion of the ISA from PCT/KR2014/000973, dated Jun. 26, 2014.

* cited by examiner

FIG. 6B

| Protocol Version | Type | Subtype | To DS | From DS | More Fragments | Re-try | Power Management | More Data | Protected Frame | Order |
|---|---|---|---|---|---|---|---|---|---|---|
| B0 B1 | B2 B3 | B4 B7 | B8 | B9 | B10 | B11 | B12 | B13 | B14 | B15 |
| 2 | 2 | 4 | 1 | 1 | 1 | 1 | 1 | 1 | 1 | 1 |

Bits:

FIG. 7

| Element ID | Length | Information |
|---|---|---|

Octets:   1   1   variable

FIG. 8A

| Element ID | Length | Local Power Constraint |
|---|---|---|

Octets:   1   1   1

FIG. 8B

| Element ID | Length | Minimum Transmit Power Capability | Maximum Transmit Power Capability |
|---|---|---|---|

Octets:   1   1   1   1

FIG. 9A

| Element ID | Length | First Channel Number | Number of Channel |
|---|---|---|---|

One (first channel, number of channels) turple for each subband

Octets :   1   1   1   1

FIG. 9B

| Element ID | Length | Channel Switch Mode | New Channel Number | Channel Switch Count |
|---|---|---|---|---|
| 1 | 1 | 1 | 1 | 1 |

Octets :

FIG. 10A

| Operating Class | Channel Number | Randomization Interval | Measurement Duration | Optional Subelements |
|---|---|---|---|---|

Octets: 1 1 2 2 variable

FIG. 10B

| Reporting Condition | Channel Load Reference Value |
|---|---|//
Octets : 1 1

FIG. 11A

| Operating Class | Channel Number | Actual Measurement Start Time | Measurement Durating | Channel Load | Optional Subelements |
|---|---|---|---|---|---|
| 1 | 1 | 8 | 2 | 1 | variable |

Octets :

FIG. 11B

| Element ID | Length | Operating Class | Channel List |
|---|---|---|---|
| 1 | 1 | 1 | variable |

Octets :

FIG. 12A

| Element ID | Length | Channel Switch Mode | New Operating Class | New Channel Number | Channel Switch Count |
|---|---|---|---|---|---|
| 1 | 1 | 1 | 1 | 1 | 1 |

Octets :

FIG. 12B

| Element ID | Length | Country String | First Channel Number / Operating Extension Identifier | Number of Channels / Operating Class | Maximum Transmit Power level / Coverage Class | Pad (if needed) |
|---|---|---|---|---|---|---|
| 1 | 1 | 3 | 1 | 1 | 1 | 0 or 1 |

These three fields are repeated, as determined by the Length field

Octets :

FIG. 16

| TPC info Request | Channel number/ operating class | Max_TP | A_TP | ANPI | RSPI | Load | Measurement duration | Reporting (periodic or event) | Reporting interval or trigger conditions(index, threshold) |
|---|---|---|---|---|---|---|---|---|---|
| x octet | y octet | 1 bit | 1 bit | 1 bit | 1 bit | 1 bit | var | 1 bit | var |

Request information: Max_TP, A_TP, ANPI, RSPI, Load, Measurement duration

TPC information reporting configuration: Reporting, Reporting interval or trigger conditions

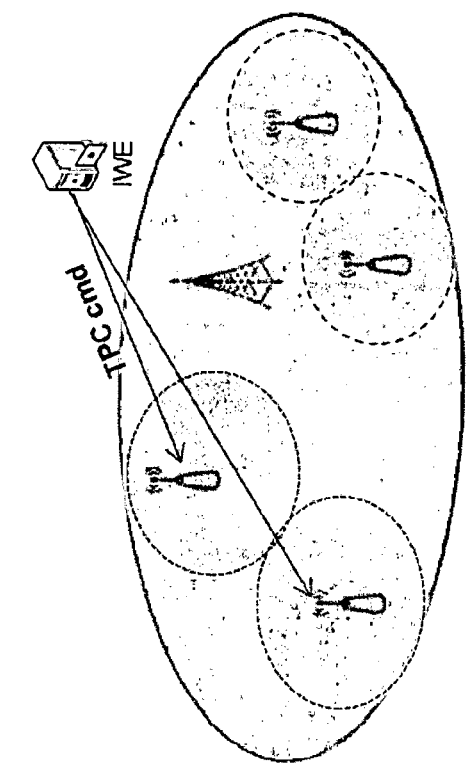
FIG. 19
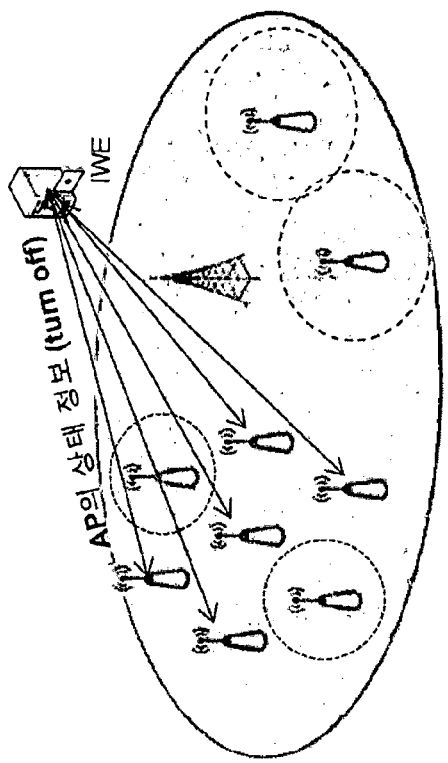

METHOD AND APPARATUS FOR PERFORMING TRANSMIT (TX) POWER CONTROL IN CONVERGENCE NETWORK OF PLURAL COMMUNICATION SYSTEMS

This application is a 35 USC §371 National Stage entry of International Application No. PCT/KR2014/000973 filed Feb. 5, 2014, which claims priority to U.S. Provisional Application No. 61/765,046, filed on Feb. 15, 2013, all of which are incorporated by reference in their entirety herein.

TECHNICAL FIELD

The present invention relates to wireless communication, and more particularly to a method and apparatus for performing transmit (Tx) power control in a plurality of communication system convergence networks.

BACKGROUND ART

There is a multi-RAT user equipment (UE) having capability in which the multi-RAT UE can access two or more radio access technologies (RATs). In order to access a specific RAT, connection to a specific RAT can be established on the basis of a UE request, and data transmission/reception can be achieved on the basis of the UE request.

However, although the multi-RAT UE has the capability to access two or more RATs, the multi-RAT UE cannot simultaneously access multiple RATs. In other words, although a current UE has multi-RAT capability, the UE cannot simultaneously transmit and receive data through different RATs.

The conventional multi-RAT technology need not perform interworking between a WLAN and a cellular network, such that overall system efficiency is low. However, a method for solving such low system efficiency has not yet been researched and discussed.

DISCLOSURE

Technical Problem

An object of the present invention is to provide a method for supporting transmit (Tx) power control in a plurality of communication system convergence networks.

An object of the present invention is to provide an entity of a communication system configured to perform Tx power control in a plurality of communication system convergence networks.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for performing transmit power control (TPC) in a plurality of communication system convergence networks including: receiving, by a first entity of a first communication system, a TPC information request message requesting information associated with transmit power control (TPC) from a second entity of a second communication system; upon receiving a request of the TPC information request message, transmitting a first TPC information reporting message, which includes a maximum transmit (Tx) power value of the first entity and an interference signal value caused by a neighbor entity of the first entity, to the second entity; receiving a TPC command message, which includes information of the maximum Tx power value of the first entity adjusted based on the maximum Tx power value of the first entity and the interference signal value, from the second entity; and adjusting the maximum Tx power value of the first entity based on information regarding the adjusted maximum Tx power of the first entity.

The method may further include: transmitting a message including information regarding a UE local maximum transmit (Tx) power value decided on the basis of the adjusted maximum Tx power value of the first entity to the user equipment (UE). The TPC information request information message may include information indicating event-triggered reporting according to periodic reporting of the TPC information or according to satisfaction of a triggering condition. The maximum transmit (Tx) power value of the first entity may be a maximum Tx power value specified for the first entity or a maximum Tx power value currently configured in the first entity. The method may further include: transmitting a second TPC information reporting message including information of the regulatory maximum Tx power value of the first entity to the second entity. The triggering condition may include one case in which the interference signal value caused by the neighbor entity is equal to or higher/less than a specific threshold value, or another case in which load of a cell including the first entity is equal to or higher/less than a specific threshold value. If the interference signal value caused by the neighbor entity of the first entity is equal to or higher than a predetermined threshold value, the adjusted maximum Tx power value of the first entity may be controlled to be lower than the first-entity maximum Tx power value contained in the first TPC information reporting message. If the interference signal value caused by the neighbor entity of the first entity is less than a predetermined threshold value, the adjusted maximum Tx power value of the first entity is controlled to be higher than the first-entity maximum Tx power value contained in the first TPC information reporting message. The first communication system is a WLAN system, the first entity is an access point (AP), the second communication system is a cellular communication system, and the second entity is any one of a base station (BS), a Mobility Management Entity (MME), or an Interworking Management Entity (IWME).

In accordance with another aspect of the present invention, a first entity of a first communication system configured to perform transmit power control (TPC) in a plurality of communication systems includes: a receiver configured to receive a TPC information request message requesting information associated with transmit power control (TPC) from a second entity of a second communication system; a transmitter, upon receiving a request of the TPC information request message, configured to transmit a first TPC information reporting message, which includes a maximum transmit (Tx) power value of the first entity and an interference signal value caused by a neighbor entity of the first entity, to the second entity, wherein the receiver is configured to receive a TPC command message including information of the maximum Tx power value of the first entity adjusted based on the maximum Tx power value of the first entity and the interference signal value, from the second entity; and a processor configured to regulate the maximum Tx power value of the first entity based on the information regarding the adjusted maximum Tx power of the first entity.

The transmitter may be configured to transmit a message including information regarding a UE local maximum transmit (Tx) power value decided on the basis of the regulatory maximum Tx power value of the first entity to the user equipment (UE). The TPC information request information message may include information indicating event-triggered reporting according to periodic reporting of the TPC information or according to satisfaction of a triggering condition. The transmitter may be configured to transmit a second TPC information reporting message including information of the adjusted maximum Tx power value of the first entity to the second entity.

Advantageous Effects

As is apparent from the above description, tightly-coupled interworking between the AP and the cellular network is provided according to the embodiments, the entity for managing interworking can more efficiently control interference mitigation between APs and power saving of each AP under the AP jamming situation, resulting in increased system efficiency.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 6B is a conceptual diagram illustrating a frame control field.

FIG. 7 is a conceptual diagram illustrating an Element Format of the IEEE 802.11 system.

FIG. 8A is a conceptual diagram illustrating an example of Power Constraint Element format.

FIG. 8B is a conceptual diagram illustrating an example of Power Capability Element format.

FIG. 9A is a conceptual diagram illustrating an example of Supported Channels Element format.

FIG. 9B is a conceptual diagram illustrating an example of Channel Switch Announcement element format.

FIG. 10A is a conceptual diagram illustrating an example of measurement request field format for channel load request.

FIG. 10B is a conceptual diagram illustrating an example of channel load reporting information data field format.

FIG. 11A is a conceptual diagram illustrating an example of measurement report field format for channel load report.

FIG. 11B is a conceptual diagram illustrating an example of AP Channel Report element format.

FIG. 12A is a conceptual diagram illustrating an example of Extended Channel Switch Announcement element.

FIG. 12B is a conceptual diagram illustrating an example of count element format.

FIG. 16 is a conceptual diagram illustrating an example of TPC information request message format.

FIG. 19 is a conceptual diagram illustrating a second scenario for transmitting a TPC command message.

BEST MODE

Figure 1:
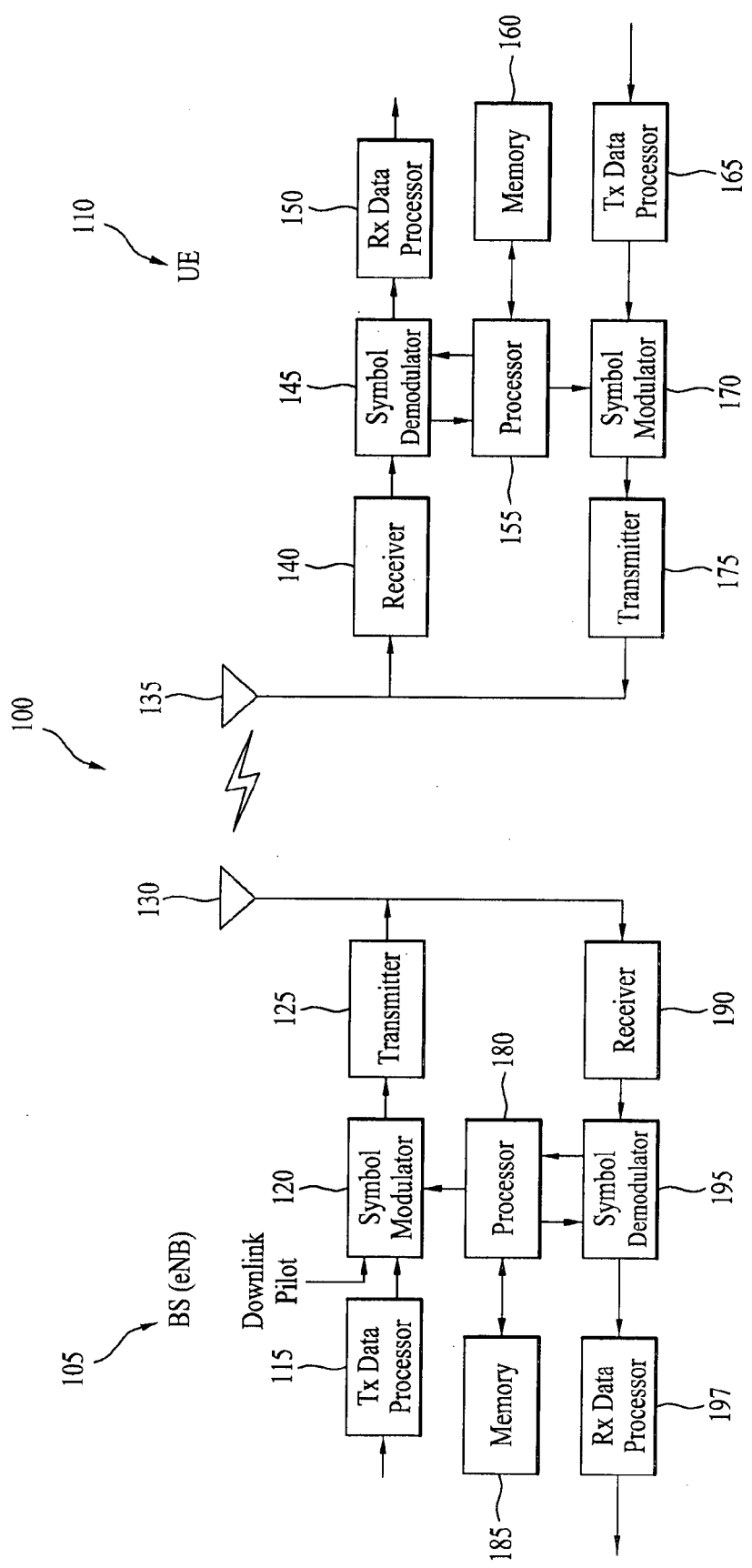
FIG. 1 is a block diagram illustrating a base station (BS) and a user equipment (UE) for use in a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE or LTE-A system, but the present invention is not limited thereto and the remaining parts of the present invention other than unique characteristics of the 3GPP LTE or LTE-A system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like. The term "UE" for use in the present invention may also be referred to as a Machine to Machine (M2M) terminal or a Human Type Communication (HTC) terminal.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

FIG. 1 is a block diagram illustrating a base station (BS) 105 and a user equipment (UE) 110 for use in a wireless communication system 100 according to the present invention.

Although FIG. 1 shows one UE 105 and one UE 110 (including a D2D UE) for brief description of the wireless communication system 100, it should be noted that the wireless communication system 100 may further include one or more BSs and/or one or more UEs.

Referring to FIG. 1, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 1, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

While the UE processor 155 enables the UE 110 to receive signals and can process other signals and data, and the BS processor 180 enables the BS 105 to transmit signals and can process other signals and data, the processors 155 and 180 will not be specially mentioned in the following description. Although the processors 155 and 180 are not specially mentioned in the following description, it should be noted that the processors 155 and 180 can process not only data transmission/reception functions but also other operations such as data processing and control.

Figure 2:
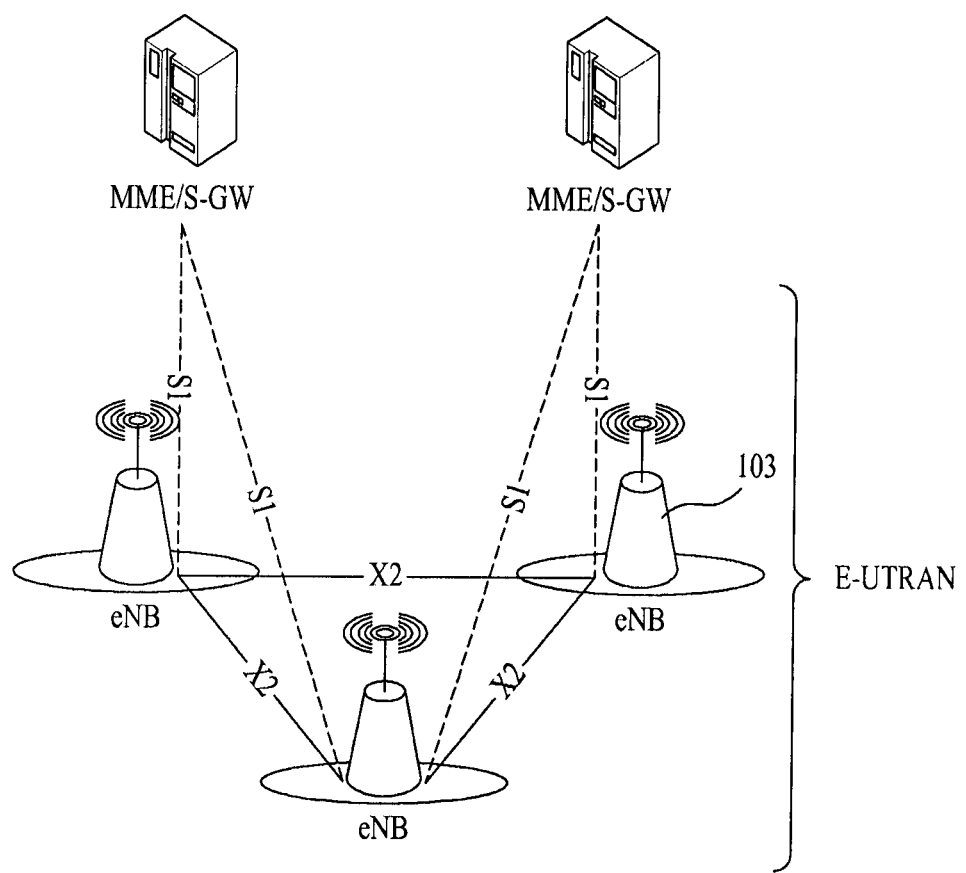
FIG. 2 shows an exemplary overall architecture of the 3GPP LTE system.

FIG. 2 shows an exemplary overall architecture of the 3GPP LTE system.

Referring to FIG. 2, The E-UTRAN may include eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface. The S1 interface supports a many-to-many relation between MMEs/Serving Gateways and eNBs.

Figure 3:
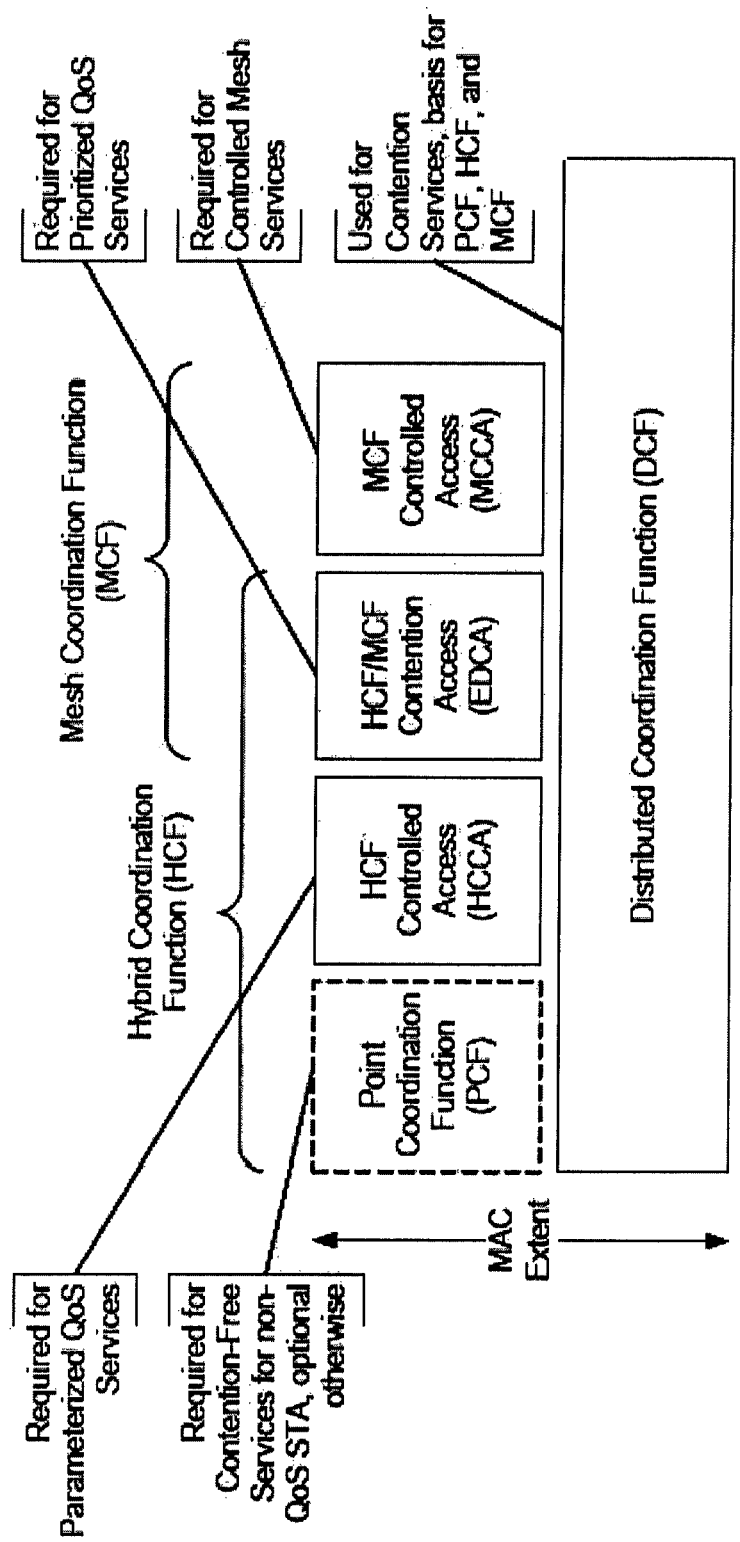
FIG. 3 shows a Medium Access Control (MAC) architecture of the IEEE 802.11 system.

FIG. 3 shows a Medium Access Control (MAC) architecture of the IEEE 802.11 system.

Referring to FIG. 3, The fundamental access method of the IEEE 802.11 MAC is a DCF (Distributed Coordination Function) known as carrier sense multiple access with collision avoidance (CSMA/CA). The DCF shall be implemented in all STAs. The IEEE 802.11 MAC may also incorporate an optional access method called a PCF, which is only usable on infrastructure network configurations. This access method uses a PC, which shall operate at the AP of the BSS, to determine which STA currently has the right to transmit. The QoS facility includes an additional coordination function called HCF (Hybrid coordination function) that is only usable in QoS network configurations. The HCF shall be implemented in all QoS STAs except mesh STAs.

The HCCA (HCF controlled channel access) mechanism uses a QoS-aware centralized coordinator, called a hybrid coordinator (HC), and operates under rules that are different from the PC of the PCF. The HC is collocated with the AP of the BSS and uses the HC's higher priority of access to the WM to initiate frame exchange sequences and to allocate TXOPs to itself and other STAs in order to provide limited-duration CAPs for contention-free transfer of QoS data.

The HC traffic delivery and TXOP allocation may be scheduled during the CP (Contention Period) and any locally generated CFP (Contention-Free Period) (generated optionally by the HC) to meet the QoS requirements of a particular TC (Traffic Category) or TS (Traffic Stream). TXOP allocations and contention-free transfers of QoS traffic might be based on the HC's BSS-wide knowledge of the amounts of pending traffic belonging to different TS and/or TCs and are subject to BSS-specific QoS policies.

CS Mechanism

Physical and virtual CS functions are used to determine the state of the medium. When either function indicates a busy medium, the medium shall be considered busy; otherwise, it shall be considered idle. A physical CS mechanism shall be provided by the PHY. See Clause 7 for how this information is conveyed to the MAC. The details of physical CS are provided in the individual PHY specifications. A virtual CS mechanism shall be provided by the MAC. This mechanism is referred to as the NAV. The NAV maintains a prediction of future traffic on the medium based on duration information that is announced in RTS/CTS frames prior to the actual exchange of data. The duration information is also available in the MAC headers of all frames sent during the CP other than PS-Poll frames.

The CS mechanism combines the NAV state and the STA's transmitter status with physical CS to determine the busy/idle state of the medium. The NAV may be thought of as a counter, which counts down to 0 at a uniform rate. When the counter is 0, the virtual CS indication is that the medium is idle; when nonzero, the indication is busy. The medium shall be determined to be busy when the STA is transmitting.

MAC-Level Acknowledgements

The reception of some frames, as described in 9.3.2.8 and 9.4.4.5, requires the receiving STA to respond with an acknowledgment if the FCS of the received frame is correct. This technique is known as positive acknowledgment.

Lack of reception of an expected frame containing an acknowledgement indicates to the STA initiating the frame exchange that an error has occurred. Note, however, that the destination STA may have received the frame correctly, and that the error may have occurred in the transfer or reception of the frame containing an acknowledgement. When a frame containing an acknowledgement is lost, the MAC that initiated the frame exchange does not receive a protocol indication of whether the initial frame was correctly received.

Figure 4:
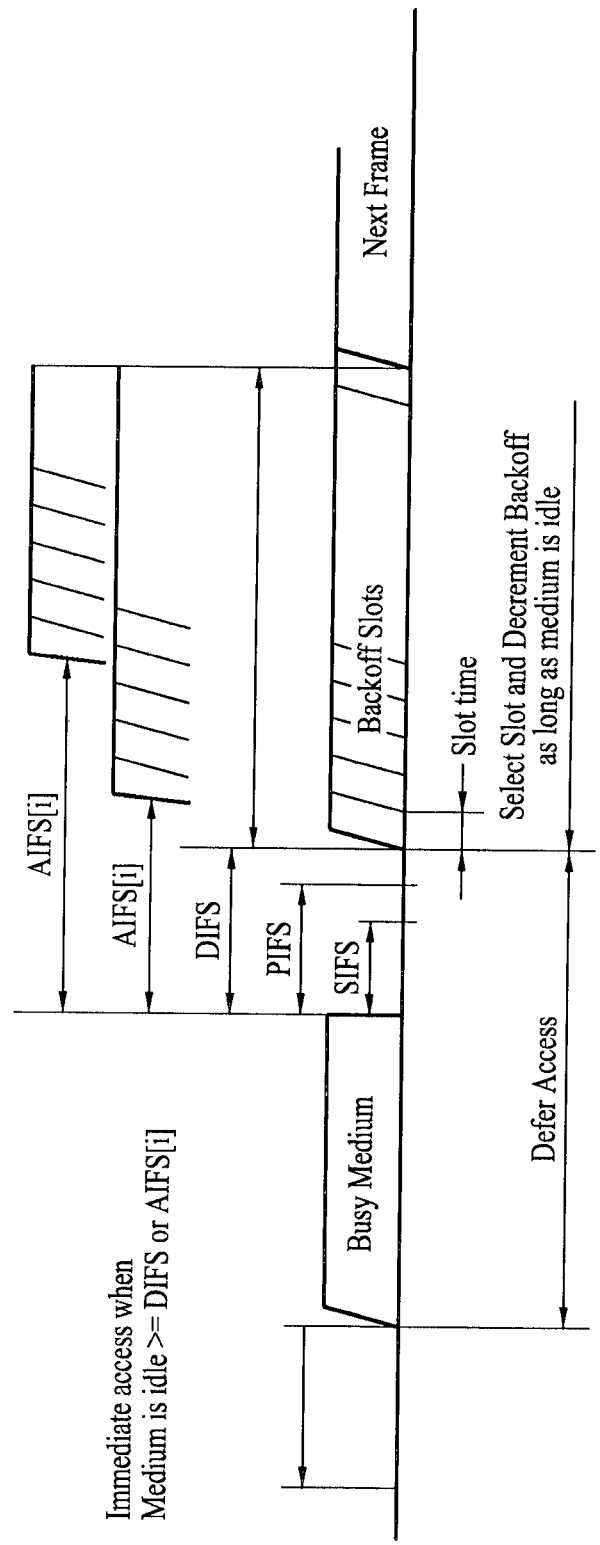
FIG. 4 shows an example of some IFS relationships of the IEEE 802.11 system.

FIG. 4 shows an example of some IFS relationships of the IEEE 802.11 system.

Referring to FIG. 4, the time interval between frames is called the IFS. A STA shall determine that the medium is idle through the use of the CS function for the interval specified. Six different IFSs are defined to provide priority levels for access to the wireless medium. FIG. 4 shows some of these relationships.

The IFSs are:
a) RIFS: reduced interframe space
b) SIFS: short interframe space
c) PIFS: PCF interframe space
d) DIFS: DCF interframe space e) AIFS: arbitration interframe space (used by the QoS facility)

f) EIFS: extended interframe space

Figure 5A:
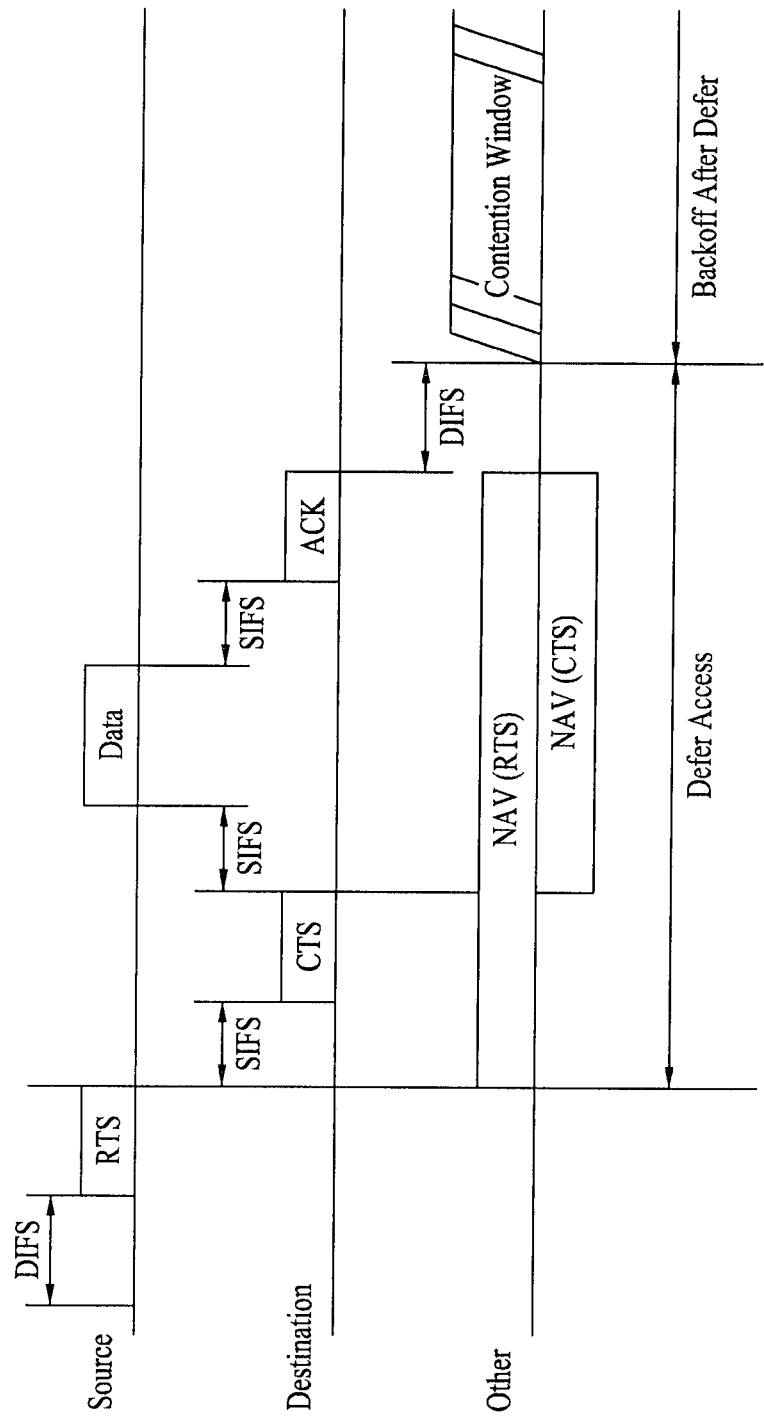
FIG. 5A is a conceptual diagram illustrating RTS/CTS/data/ACK and NAV configuration.
Figure 5B:
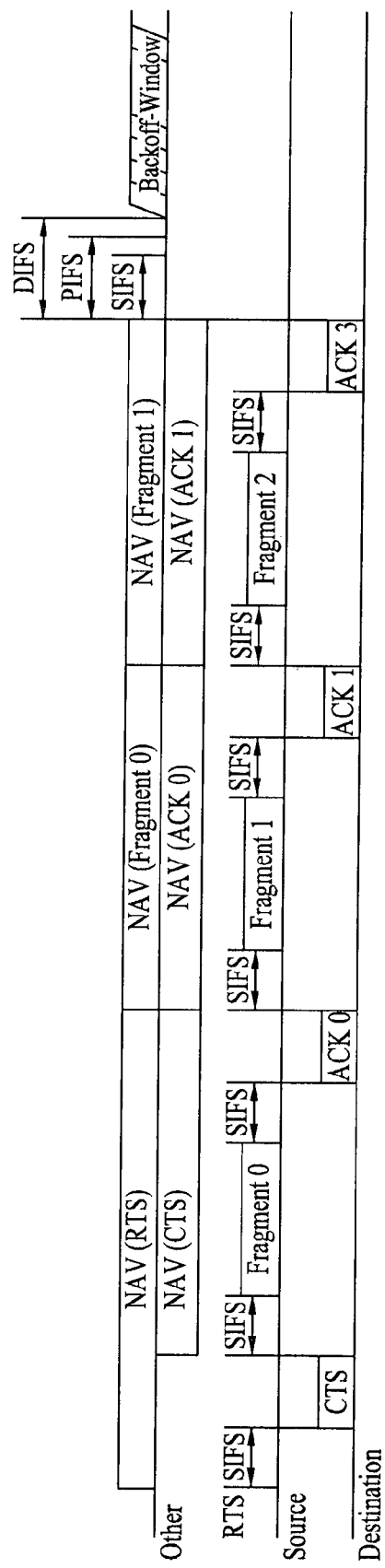
FIG. 5B is a conceptual diagram illustrating RTS/CTS along with fragmented MSDU.

FIG. 5A is a conceptual diagram illustrating RTS/CTS/data/ACK and NAV configuration, and FIG. 5B is a conceptual diagram illustrating RTS/CTS along with fragmented MSDU.

FIG. 5a indicates the NAV for STAs that may receive the RTS frame, while other STAs may only receive the CTS frame, resulting in the lower NAV bar as shown (with the exception of the STA to which the RTS was addressed).

Figure 6A:
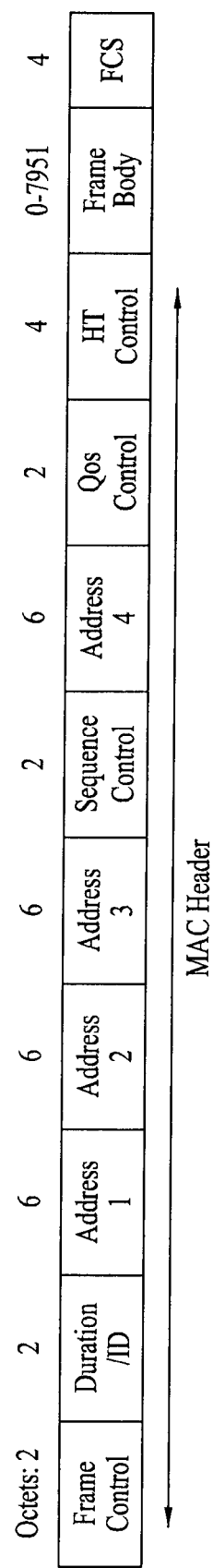
FIG. 6A is a conceptual diagram illustrating a MAC frame format of the IEEE 802.11 system.

FIG. 6A is a conceptual diagram illustrating a MAC frame format of the IEEE 802.11 system, and FIG. 6B is a conceptual diagram illustrating a frame control field.

Each frame consists of the following basic components. a) A MAC header, which comprises frame control, duration, address, optional sequence control information, optional QoS Control information (QoS data frames only), and optional HT Control fields (+HTC frames only). b) A variable-length frame body, which contains information specific to the frame type and subtype. c) A FCS, which contains an IEEE 32-bit CRC.

Management Frame Body Components

1. Fields that are not Information Elements

Max Transmit Power Field

The Max Transmit Power field is a twos complement signed integer and is 1 octet in length, providing an upper limit, in units of dBm, on the transmit power as measured at the output of the antenna connector to be used by that AP on the current channel.

Operation of the Max Transmit Power field

The maximum tolerance for the value reported in Max Transmit Power field shall be 5 dB. The value of the Max Transmit Power field shall be less than or equal to the Max Regulatory Power value for the current channel.

Transmit Power Used Field

The Transmit Power Used field is twos complement signed integer and is 1 octet in length. It is less than or equal to the Max Transmit Power and indicates the actual power used as measured at the output of the antenna connector, in units of dBm, by a STA when transmitting the frame containing the Transmit Power Used field. The Transmit Power Used value is determined anytime prior to sending the frame in which it is contained and has a tolerance of ±5 dB.

Target Channel

The Target Channel field specifies the channel number of the target channel. The length of the Target Channel field is 1 octet.

2. Information Elements

FIG. 7 is a conceptual diagram illustrating an Element Format of the IEEE 802.11 system.

Referring to FIG. 7, Elements are defined to have a common general format consisting of a 1 octet Element ID field, a 1 octet Length field, and a variable-length element-specific Information field. Each element is assigned a unique Element ID as defined in this standard. The Length field specifies the number of octets in the Information field. Table 1 shows Element IDs.

TABLE 1

| Element | Element ID | Length of indicated element (in octets) | Extensible |
|---|---|---|---|
| SSID (see 8.4.2.2) | 0 | 2 to 34 | |
| Power Constraint (see 8.4.2.16) | 32 | 3 | |
| Power Capability (see 8.4.2.17) | 33 | 4 | |
| TPC Request (see 8.4.2.18) | 34 | 2 | |
| TPC Report (see 8.4.2.19) | 35 | 4 | |
| Supported Channels (see 8.4.2.20) | 36 | 4 to 256 | |
| Channel Switch Announcement (see 8.4.2.21) | 37 | 5 | |
| Measurement Request (see 8.4.2.23) | 38 | 5 to 257 | Subelements, for formats using 8.4.2.23.4 to 8.4.2.23.12. |
| Measurement Report (see 8.4.2.24) | 39 | 5 to 257 | Subelements, for formats using 8.4.2.24.4 to 8.4.2.24.11. |
| Quiet (see 8.4.2.25) | 40 | 8 | |
| IBSS DFS (see 8.4.2.26) | 41 | 10 to 255 | |
| AP Channel Report (see 8.4.2.38) | 51 | 3 to 257 | |
| Neighbor Report (see 8.4.2.39) | 52 | 15 to 257 | Subelements |
| Extended Channel Switch Announcement (see 8.4.2.55) | 60 | 6 | |
| Channel Switch Timing (see 8.4.2.66) | 104 | 6 | Yes |

Power Constraint Element

FIG. 8A is a conceptual diagram illustrating an example of Power Constraint Element format.

The Power Constraint element contains the information necessary to allow a STA to determine the local maximum transmit power in the current channel. The field is coded as an unsigned integer in units of decibels. The local maximum transmit power for a channel is thus defined as the maximum transmit power level specified for the channel in the Country element minus the local power constraint specified for the channel (from the MIB) in the Power Constraint element.

The Power Constraint element is included in Beacon frames and Probe Response frames.

Specification of Regulatory and Local Maximum Transmit Power Levels

A lower local maximum transmit power level may be used for other purposes (e.g., range control, reduction of interference).

An AP in a BSS, a STA in an IBSS, and a mesh STA in an MBSS shall advertise the regulatory (or adjusted) maximum transmit power for that STA's operating channel in Beacon frames and Probe Response frames using a Country element. An AP in a BSS, a STA in an IBSS, and a mesh STA in an MBSS shall advertise the local maximum transmit power for that STA's operating channel in Beacon frames and Probe Response frames using the combination of a Country element and a Power Constraint element.

Selection of a Transmit Power

A STA may select any transmit power for transmissions in a channel within the following constraints:

A STA shall determine a adjusted (or regulatory) maximum transmit power and a local maximum transmit power for a channel in the current regulatory domain before transmitting in the channel. An AP shall use a transmit power less than or equal to the regulatory maximum transmit power level for the channel. The AP shall also meet any regulatory mitigation requirement. A STA that is not an AP shall use a transmit power less than or equal to the local maximum transmit power level for the channel.

FIG. 8B is a conceptual diagram illustrating an example of Power Capability Element format.

The Power Capability element specifies the minimum and maximum transmit powers with which a STA is capable of transmitting in the current channel. The format of the Power Capability element is shown in FIG. 8b. The Power Capability element is included in Association Request frames, as described in 8.3.3.5; Reassociation Request frames and Mesh Peering Open frame.

Association Based on Transmit Power Capability

A STA shall provide an AP with its minimum and maximum transmit power capability for the current channel when associating or reassociating, using a Power Capability element in Association Request frames or Reassociation Request frames. An AP may use the minimum and maximum transmit power capability of associated STAs as an input into the algorithm used to determine the local transmit power constraint for any BSS it maintains. The specification of the algorithm is beyond the scope of this standard.

FIG. 9A is a conceptual diagram illustrating an example of Supported Channels Element format.

The Supported Channels element contains a list of channel subbands in which a STA is capable of operating. The format of the Supported Channels element is shown in FIG. 9a. The Length field is variable and depends on the number of subbands, defined by a First Channel Number-Number of Channels pair, that are included in the element. The First Channel Number field is set to the first channel (as defined in 18.3.8.4.3) in a subband of supported channels. The Number of Channels field is set to the number of channels in a subband of supported channels. The Supported Channels element is included in Association Request frames and Reassociation Request frames and Mesh Peering Open frame.

Association Based on Supported Channels

A STA shall provide an AP with a list of the channels in which it can operate when associating or reassociating using a Supported Channels element in Association Request frames or Reassociation Request frames. An AP may use the supported channels list for associated STAs as an input into an algorithm used to select a new channel for the BSS. The specification of the algorithm is beyond the scope of this standard.

Selecting and Advertising a New Channel in an Infrastructure BSS

The decision to switch to a new operating channel in an infrastructure BSS shall be made only by the AP. An AP may make use of the information in Supported Channel elements and the results of measurements undertaken by the AP and other STAs in the BSS to assist the selection of the new channel. The algorithm to choose a new channel is beyond the scope of this standard, but shall satisfy applicable regulatory requirements, including uniform spreading rules and channel testing rules. The AP shall attempt to select a new channel that is supported by all associated STAs, although it should be noted that this might not always be possible.

FIG. 9B is a conceptual diagram illustrating an example of Channel Switch Announcement element format.

The Channel Switch Announcement element is used by an AP in a BSS, a STA in an IBSS, or a mesh STA in an MBSS to advertise when it is changing to a new channel and the channel number of the new channel. The format of the Channel Switch Announcement element is shown in FIG. 9b. The Channel Switch Mode field indicates any restrictions on transmission until a channel switch. An AP in a BSS or a STA in an IBSS sets the Channel Switch Mode field to either 0 or 1 on transmission. In an MBSS, the Channel Switch Mode Field is reserved. The New Channel Number field is set to the number of the channel to which the STA is moving. For nonmesh STAs, the Channel Switch Count field either is set to the number of TBTTs until the STA sending the Channel Switch Announcement element switches to the new channel or is set to 0. A value of 1 indicates that the switch occurs immediately before the next TBTT. A value of 0 indicates that the switch occurs at any time after the frame containing the element is transmitted.

The Channel Switch Announcement element is included in Channel Switch Announcement frame, and may be included in Beacon frames and Probe Response frames.

Selecting and Advertising a New Channel in an Infrastructure BSS

A STA in a BSS that is not the AP shall not transmit the Channel Switch Announcement element.

Channel Switch Announcement Element Operation

A Channel Switch Mode equal to 1 means that the STA in a BSS to which the frame containing the element is addressed shall transmit no further frames within the BSS until the scheduled channel switch. A STA in an IBSS may treat a Channel Switch Mode field equal to 1 as advisory. A Channel Switch Mode equal to 0 does not impose any requirement on the receiving STA.

FIG. 10A is a conceptual diagram illustrating an example of measurement request field format for channel load request.

Referring to FIG. 10a, Operating Class indicates the channel set for which the measurement request applies. Channel Number indicates the channel number for which the measurement request applies. Randomization Interval specifies the upper bound of the random delay to be used prior to making the measurement, expressed in units of TUs. The Measurement Duration field is set to the preferred or mandatory duration of the requested measurement, expressed in units of TUs.

Table 2 shows optional subelement IDs for channel load request.

TABLE 2

| Subelement ID | Name | Length field (octets) | Extensible |
|---|---|---|---|
| 0 | Reserved | | |
| 1 | Channel Load Reporting Information | 2 | Yes |
| 2-220 | Reserved | | |
| 221 | Vendor Specific | 1 to 244 | |
| 222-255 | Reserved | | |

FIG. 10B is a conceptual diagram illustrating an example of channel load reporting information data field format.

The Channel Load Reporting Information subelement indicates the condition for issuing a Channel Load Report. Channel Load Reporting Information subelement data field format is shown in FIG. 10b and contains a 1-octet Reporting Condition subfield and a 1-octet Channel Load Reference Value subfield. The Reporting Condition is described in Table 3. The Channel Load Reference value is a Channel Load value and is the reference value for the indicated Reporting Condition.

TABLE 3

| Condition for report to be issued | Reporting Condition |
|---|---|
| Report to be issued after each measurement (default, used when Channel Load Reporting Information subelement is not included in Channel Load Request). | 0 |
| Report to be issued when measured Channel Load is equal to or greater than the reference value. | 1 |
| Report to be issued when measured Channel Load is equal to or less than the reference value. | 2 |
| Reserved | 3-255 |

FIG. 11A is a conceptual diagram illustrating an example of measurement report field format for channel load report.

Channel Load contained in a measurement report field format for Channel Load Report shown in FIG. 11A can be calculated as follows.

$$\text{Channel Load} = \text{Integer}((\text{channel busy time}/(\text{MeasurementDuration} \times 1024)) \times 255)$$

FIG. 11B is a conceptual diagram illustrating an example of AP Channel Report element format.

The AP Channel Report element contains a list of channels where a STA is likely to find an AP. The format of the AP Channel Report element is shown in FIG. 11b. Operating Class contains an enumerated value from Annex E, specifying the operating class in which the Channel List is valid. An AP Channel Report only reports channels for a single operating class. Multiple AP Channel Report elements are present when reporting channels in more than one operating class. The Channel List contains a variable number of octets, where each octet describes a single channel number. Channel numbering is dependent on Operating Class according to Annex E. Operating class indicates index value of Channel starting frequency (GHz), Channel spacing (MHz), Channel set.

FIG. 12A is a conceptual diagram illustrating an example of Extended Channel Switch Announcement element.

The Extended Channel Switch Announcement element is used by an AP in an infrastructure BSS, a STA in an IBSS, or a mesh STA in an MBSS to advertise when the BSS is changing to a new channel or a new channel in a new operating class. The announcement includes both the operating class and the channel number of the new channel. The element is present only when an extended channel switch is pending. The format of the Extended Channel Switch Announcement element is shown in FIG. 12a.

RSNI Element (Received Signal to Noise Indicator)

RSNI is in steps of 0.5 dB. RSNI is calculated by the ratio of the received signal power (RCPI-ANPI) to the noise plus interference power (ANPI) using the expression:

$$\text{RSNI} = (10 \times \log 10((\text{RCPIpower} - \text{ANPIpower})/\text{ANPIpower}) + 10) \times 2$$

where RCPIpower and ANPIpower indicate power domain values for RCPI and ANPI and not dB domain values. RSNI in dB is scaled in steps of 0.5 dB to obtain 8-bit RSNI values, which cover the range from +10 dB to +117 dB. The value 255 indicates that RSNI is not available. The RCPI (Received Channel Power Indicator) element indicates the received frame power level at the receiving STA. (including signal, noise and interference).

ANPI (Average Noise Power Indicator) is set to the average noise plus interference power value measured during the indicated Measurement Duration while the indicated channel is idle.

FIG. 12B is a conceptual diagram illustrating an example of count element format.

The Country element contains the information required to allow a STA to identify the regulatory domain in which the STA is located and to configure its PHY for operation in that regulatory domain. The format of this element is as shown in FIG. 12b. The Maximum Transmit Power Level field is a signed number and is 1 octet in length. It indicates the maximum power, in dBm, allowed to be transmitted. As the method of measurement for maximum transmit power level differs by regulatory domain, the value in this field is interpreted according to the regulations applicable for the domain identified by the Country String. An operating class is an index into a set of values for radio equipment sets of rules. The Operating Class field is 1 octet in length.

Transmit Power Control (TPC) procedures will hereinafter be described in detail.

Regulations that apply to the 5 GHz band in most regulatory domains require RLANs operating in the 5 GHz band to use transmitter power control, involving specification of a regulatory maximum transmit power and a mitigation requirement for each allowed channel, to reduce interference with satellite services. This standard describes such a mechanism, referred to as transmit power control (TPC). This subclause describes TPC procedures that may satisfy needs in many regulatory domains and other frequency bands and may be useful for other purposes (e.g., reduction of interference, range control, reduction of power consumption).

The TPC procedures provide for the following:

Association of STAs with an AP in a BSS based on the STAs' power capability.

Specification of regulatory and local maximum transmit power levels for the current channel. Selection of a transmit power for each transmission in a channel within constraints imposed by regulatory and local requirements.

Adaptation of transmit power based on a range of information, including path loss and link margin estimates.

Adaptation of the transmit power will hereinafter be described in detail.

A STA may use any criteria, and in particular any path loss and link margin estimates, to dynamically adapt the transmit power for transmissions of an MPDU to another STA. The adaptation methods or criteria are beyond the scope of this standard. A STA may use a TPC Request frame to request another STA to respond with a TPC Report frame containing link margin and transmit power information. A STA receiving a TPC Request frame shall respond with a TPC Report frame containing the power used to transmit the response in the Transmit Power field and the estimated link margin in a Link Margin field. An AP in a BSS or a STA in an IBSS shall autonomously include a TPC Report element with the Link Margin field set to 0 and containing transmit power information in the Transmit Power field in any Beacon frame or Probe Response frame it transmits.

The Link Margin field contains the link margin for the receive time and for the receive rate of the frame containing the TPC Request element or the Link Measurement Request frame. The field is coded as a twos complement signed integer in units of decibels. The Link Margin field is reserved when a TPC Report element is included in a Beacon frame or Probe Response frame. The measurement method of Link Margin is beyond the scope of this standard.

The conventional inter RAT technology has been designed on a UE request, and does not require interworking between the WLAN and the cellular network. In the conventional inter RAT technology, a specific network server manages WLAN information, and inter RAT handover may be possible upon receipt of the UE request. Although UEs can simultaneously access the multiple RAT, flow mobility/IP-flow mapping of the network level may be supported without control of the radio level, such that the UEs can simultaneously access the multiple RAT. As a result, the conventional art does not require any control connection between the AP and the cellular network, and is designed on the basis of the UE request. However, in order to increase overall network efficiency using the multi RAT technology, it may be necessary to provide a network-based tightly-coupled management, instead of using the UE request. Direct control connection between different RATs is configured so that more efficient and rapid inter-RAT interworking is needed.

In order to increase energy efficiency of the overall system, it is necessary for the multiple RAT management entities to control interference mitigation between APs under the AP jamming environment.

A method for deciding AP Transmit Power used by IEEE 802.11 will hereinafter be described in detail. Tx power of the AP may decided not only by Transmit Power Capability of STAs located below the AP but also by regulatory transmit power of the AP.

First, the STA may transmit its own max/min power capability to the AP during association. Second, the AP may calculate local power constraint on the basis of received max/min power capability of STAs. Third, the AP may transmit the following parameters through a beacon signal or a probe response message, etc.

Local Maximum Transmit Power (=Max Transmit Power–Local Power Constraint)

Max Transmit Power≤Max Regulatory Power value for the current channel

Local Power Constraint

Regulatory Maximum Transmit Power

STA's transmit power≤Local maximum transmit power

AP's transmit power≤Regulatory maximum transmit power

For various purposes such as interference reduction, range control, power consumption, etc., Tx power of the STA and the Tx power of the AP may be dynamical adapted. Tx power information of the AP may be dynamically adapted through the beacon or probe response message, so that TPC (Transmit Power Control) can be decided by AP control. However, assuming that tightly-coupled interworking between the AP and the cellular network is provided, the entity for managing interworking may more efficiently control interference mitigation between APs and power saving of the APs under the AP jamming situation, such that it is expected that overall system efficiency increases.

Figure 13:
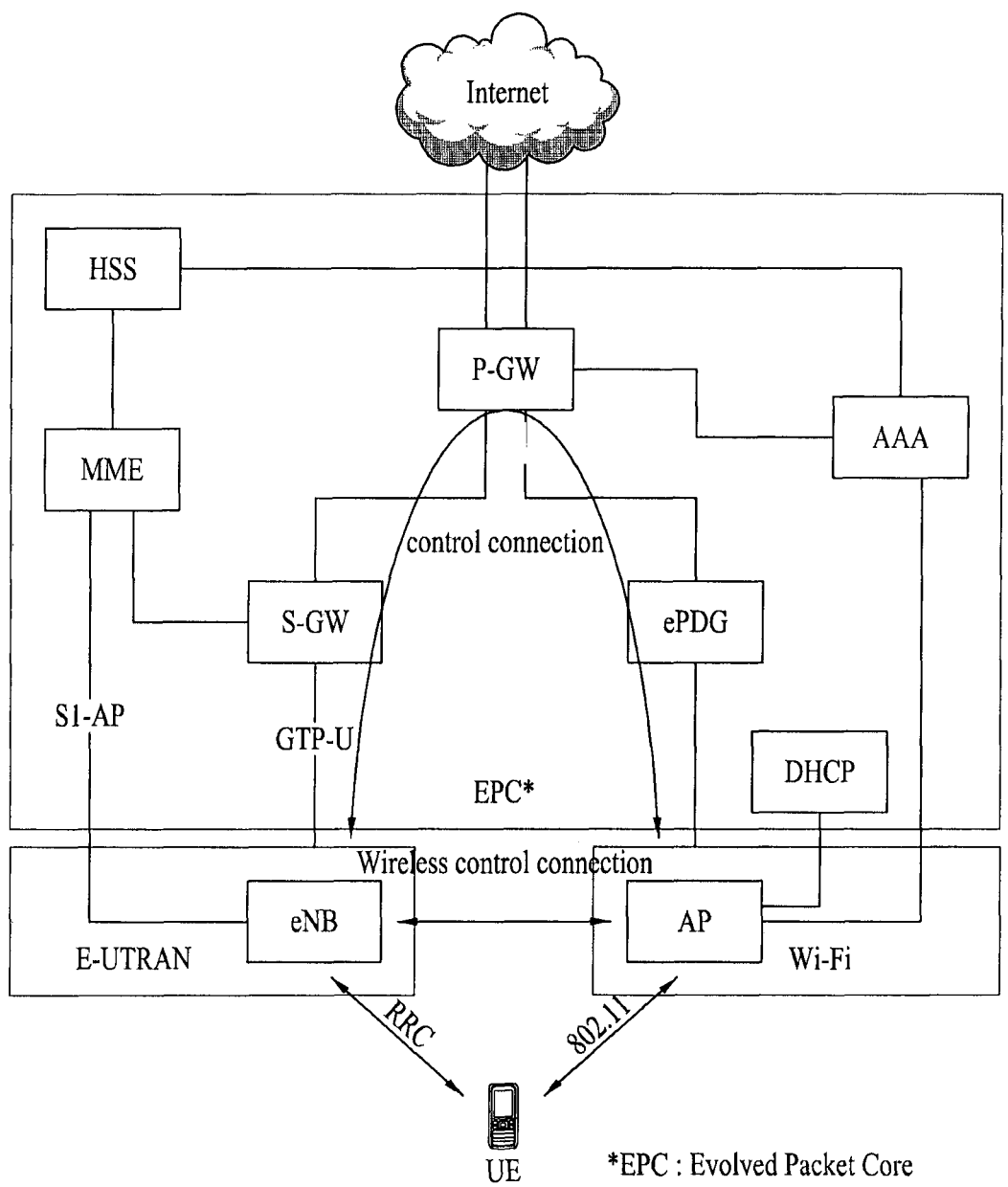
FIG. 13 is a conceptual diagram illustrating a network structure for explaining an interworking structure between a first communication system (e.g., LTE system) and a second communication system (e.g., Wi-Fi system).

FIG. 13 is a conceptual diagram illustrating a network structure for explaining an interworking structure between a first communication system (e.g., LTE system) and a second communication system (e.g., Wi-Fi system).

As can be seen from the network structure of FIG. 13, a backhaul control connection may be present between an AP and an eNB through a backbone network (e.g., P-GW or Evolved Packet Core (EPC)), or a wireless control connection may be present between the AP and the eNB. For peak throughput and data traffic offloading, the UE may simultaneously support a first communication system (or a first communication network) configured to use a first wireless communication scheme and a second communication system (or a second communication network) configured to use a second wireless communication scheme through interworking between a plurality of communication networks. In this case, the first communication network may be referred to as a primary network, and the first communication system may be referred to as a primary system. The second communication network may be referred to as a secondary network, and the second communication system may be referred to as a secondary system. For example, the UE may be configured to simultaneously support an LTE (or LTE-A) system and a Wi-Fi system (Near Field Communication (NFC) system such as WLAN/802.11). The above-mentioned UE may also be referred to as a multi-system capability UE.

In the network structure shown in FIG. 13, the primary system has wider coverage, and may be a network for transmitting control information. WiMAX or LTE (LTE-A) system may be used as an example of the primary system. Meanwhile, a secondary system has a network having small coverage, and may be a system for data transmission. For example, the secondary system may be a WLAN or Wi-Fi system.

The present invention assumes the following items, and a detailed description thereof will hereinafter be described in detail.

It is assumed that an entity for managing interworking is an entity contained in a cellular network, and an interworking function is implemented in the following three entities.

e-NB—Reuse existing entity

Mobility Management Entity (MME)—Reuse existing entity

InterWorking Management Entity (IWME)—Define new entity

The interworking function is associated with an interworking-related procedure between the eNB and the UE or between the eNB and the AP, an entity for managing interworking may store and/or manage AP information. The eNB, MME, and/or IWME may store/manage information of APs covered thereby. It is assumed that the relationship between the access point (AP) of the secondary system (e.g., Wi-Fi) and the eNB (or MME or IWME) acting as an AP of the primary system (e.g., LTE or WiMAX) is denoted by control connection.

Method 1: Wired Control Connection

New interface is established through a backbone network.

Method 2: Wireless Control Connection

In a technical idea of the present invention, an AP having an air interface relationship with the eNB is referred to as an eAP. That is, the eAP must support not only 802.11 MAC/PHY but also the LTE protocol stack for communication with the eNB, may serve as the same role as an LTE UE in association with the eNB, and may communicate with the eNB.

Figure 14:
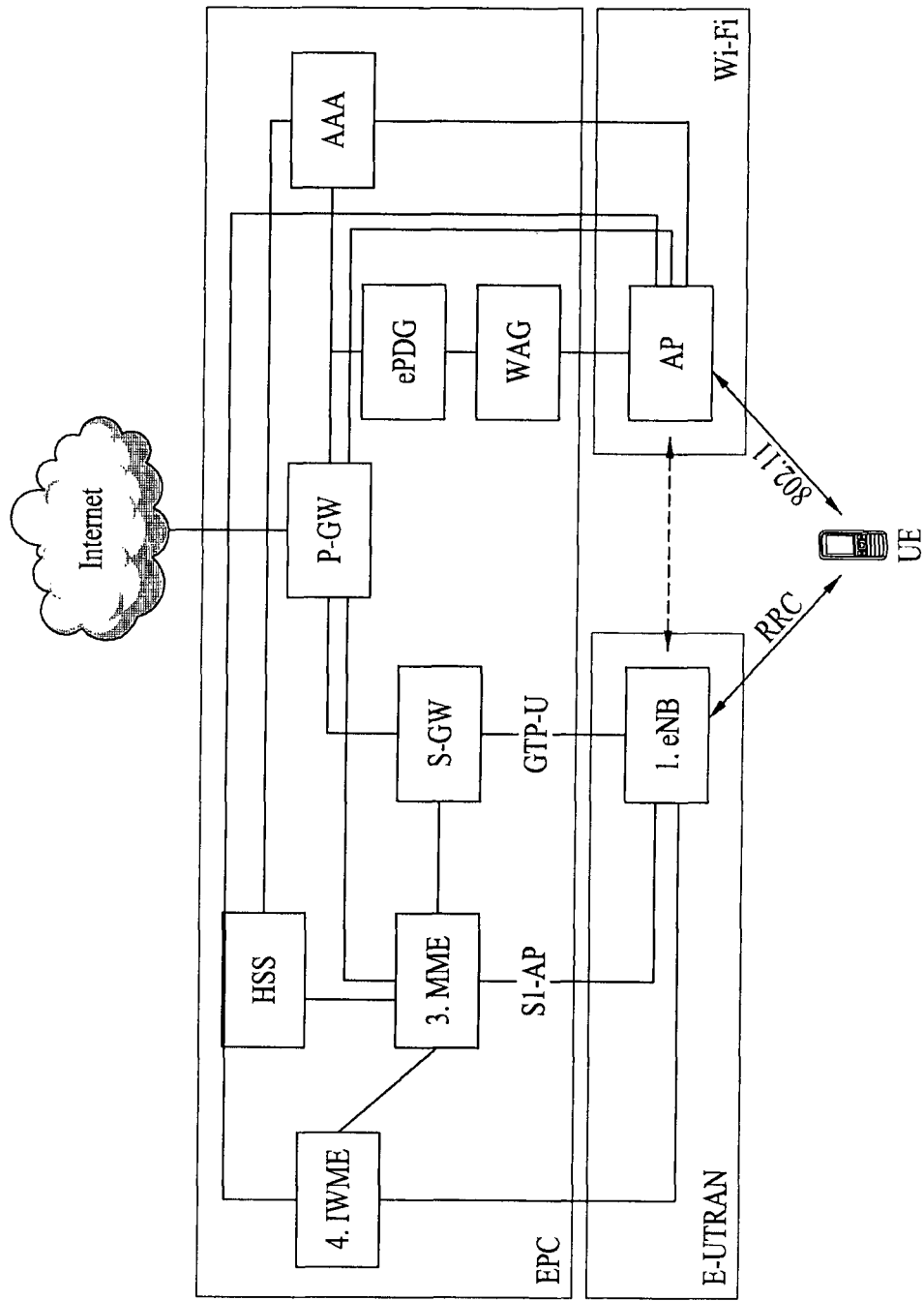
FIG. 14 is a conceptual diagram illustrating a network structure of Wi-Fi-Cellular interworking according to embodiments of the present invention.

FIG. 14 is a conceptual diagram illustrating a network structure of Wi-Fi-Cellular interworking according to embodiments of the present invention.

According to technology of the present invention, in order to enable a dual-mode UE to more efficiently use a Wi-Fi cellular convergence network under the environment in which there is a UE capable of simultaneously transmitting/receiving a Wi-Fi network and a cellular network, a dual mode UE, the cellular network can manage information of the AP according to the following four methods (Method 1~Method 4).

Method 1: Use of Air Interface Between eNB and AP

In Method 1, the eNB may control an AP using a wireless control connection to the AP in a similar way to a general UE.

Method 2: Use of Backhaul Interface Between eNB and AP

In Method 2, the eNB may control an AP using a wired control connection to the AP.

Method 3: Use of Control Interface Between MME and AP

In Method 3, an AP may be controlled using control connection between MME and AP (i.e., secondary system).

Method 4: Use of Control Interface Between IWME and AP

In Method 4, an AP can be controlled using control connection between IWME and AP (i.e., secondary system).

The present invention proposes the cellular-coordinated AP power control scheme. In addition, for interference mitigation between APs and energy efficiency of the system, the present invention will propose a procedure for AP transmit power control based on the cellular network.

Figure 15:
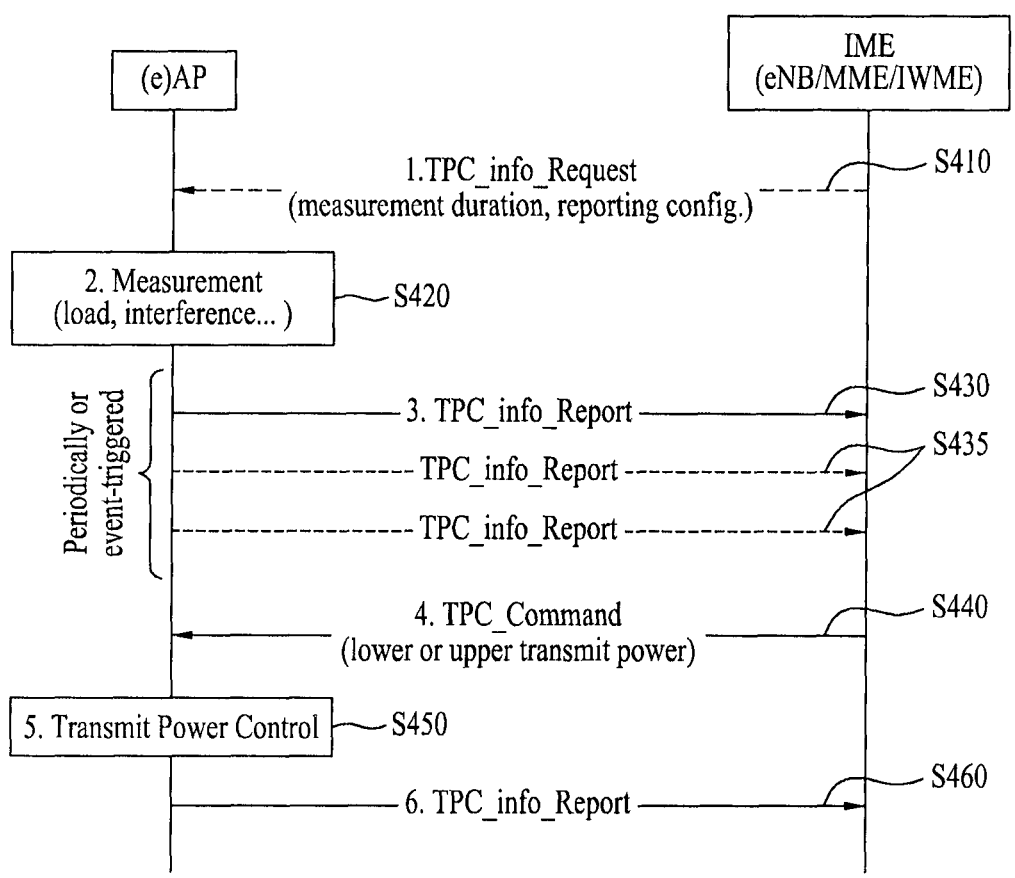
FIG. 15 is a flowchart illustrating a procedure for AP transmit (Tx) power control based on a cellular network.

FIG. 15 is a flowchart illustrating a procedure for AP transmit (Tx) power control based on a cellular network.

Referring to FIG. 15, Interworking entity (IME) may transmit a TPC information request (TPC_info_request) message for requesting reporting of transmit (Tx) power control associated information of the APs to the AP in step S410. The TPC_info_request message may include request information and TPC information reporting configuration information. The IME may be a legacy eNB of the cellular network, a legacy Mobility Management Entity (MME), or a new entity InterWorking Management Entity (IWME). In this case, the IME may request TPC information of a specific channel on the basis of AP information stored in a server thereof, or may request TPC information of all channels used by the AP. If TPC information of a specific channel is requested, the operating class and channel number list may be contained in the TPC_info_request message, and then transmitted. If TPC information of all channels used by the AP is requested, it may be possible to indicate the presence of an information request of all channels using a reserved value.

In this case, request information (bitmap format) of step S410 will hereinafter be described with reference to FIG. 16. FIG. 16 is a conceptual diagram illustrating an example of TPC information request (TPC_info_request) message format.

TPC information may be selectively requested for each channel. For this purpose, if the following field is set to 1, this means that transmission of the corresponding information is requested. MAX_TP field is set to 1 and transmitted, such that regulatory maximum transmit power of the AP channel or information of currently configured maximum transmit power (MAX TP) may be requested. Although not shown in FIG. 16, the country element field may be contained in TPC information request (TPC_info_request) format, and may include Length, Country String, First Channel Number, Maximum Transmit Power Level, Number of Channels, etc.

IWE may allocate '1' to the ATP field and transmit the resultant A_TP field, so that requesting of current transmit power (Average_TP) of a channel may be indicated.

IWE may request transmission of an interference signal value received from a neighbor BSS (a neighbor cell) or a neighbor AP. If the corresponding field is set to 1, beacon Tx timing information of the neighbor AP may also be transmitted. For example, a field for requesting information of the interference signal value received from the neighbor BSS may be an Average Noise Power Indicator (ANPI) field or a Received Signal to Noise Indicator (RSNI) field. ANPI is an average noise plus interference power value measured for a measurement interval indicated when an indicated channel is idle. The ANPI may be denoted by "RSNI=(10×log 10((RCPI$_{power}$−ANPI$_{power}$)/ANPI$_{power}$)+10)×2", where RCPI is a total channel power including signal, noise, and interference.

IWE may include load (load status information) requesting information of channel status load in the TPC_info_request message, and transmit the resultant TPC_info_request message. In addition, IWE may include a measurement duration field indicating information regarding a measurement duration in which Tx power, ANPI, RSNI, and channel load status are measured into the TPC_info_request message, and transmit the resultant TPC_info_request message.

Subsequently, the TPC_info_request message may include TPC information reporting configuration information. If the reporting field is set to zero '0', this means that periodic reporting of TPC information is indicated; and if the reporting field is set to '1', this means event-triggered reporting of TPC information, or vice versa. If the reporting field is set to zero '0', the reporting interval field is contained in the TPC_info_request message, and a reporting interval value may be contained in the reporting interval field. If the reporting field is set to '1', the trigger conditions field may be contained. Since the trigger condition is predefined, IWE and AP may share the trigger condition. For example, if ANPI or RSNI is equal to or higher/less than a threshold value, or if the channel load status is equal to higher/less than a threshold value, this means a trigger condition status. The index and threshold value of the corresponding condition may be transmitted through the trigger conditions field.

If the AP receives the TPC_info_request message from the IWE, a channel requested for transmission of information requested by the TPC_info_request message may be measured in step S420. In this case, the AP may perform interference measurement (e.g., ANPI and RSNI measurement) of neighbor APs. Alternatively, the AP receives a beacon from the neighbor AP during an idle channel time, measures a signal from the neighbor AP, and transmits a signal intensity received from the neighbor AP along with Service Set Identifier (SSID)/basic service set identification (BSSID) of the received beacon.

If the AP receives beacon Tx timing information of the neighbor AP from the IWE, it may be possible to more easily measure the AP signal using the corresponding information. In addition, the AP may measure a load status of its own cell, and may measure its own antenna Tx power.

The AP may transmit a TPC information report (TPC_info_Report) message according to reporting configuration information of the TPC_info_request message in step S430. If periodic reporting is requested by the TPC_info_request message, the AP may transmit the TPC_info_report message including requested information every interval requested by the IWE. If event-triggered reporting is requested by the TPC information request message, the AP may transmit the TPC_info_report message including requested information only when the defined trigger condition is satisfied.

Trigger conditions may also be applied to the AND operation as necessary. That is, triggering may be carried out only when all triggering conditions are satisfied. For example, if interference of the neighbor AP is identical to or higher than a specific threshold value according to Index 1, if cell load of the neighbor AP is identical to or higher than a specific threshold value according to Index 2, if cell load of the neighbor AP is identical to or less than a specific threshold value according to Index 3, and if interference of the neighbor AP is identical to or less than a specific threshold value according to Index 4, triggering may be carried out.

For Tx power control (TPC) of the AP, the AP may load the following information on the TPC_info_report message, and needs to transmit the resultant TPC_info_report message to the IWE.

Figure 17:
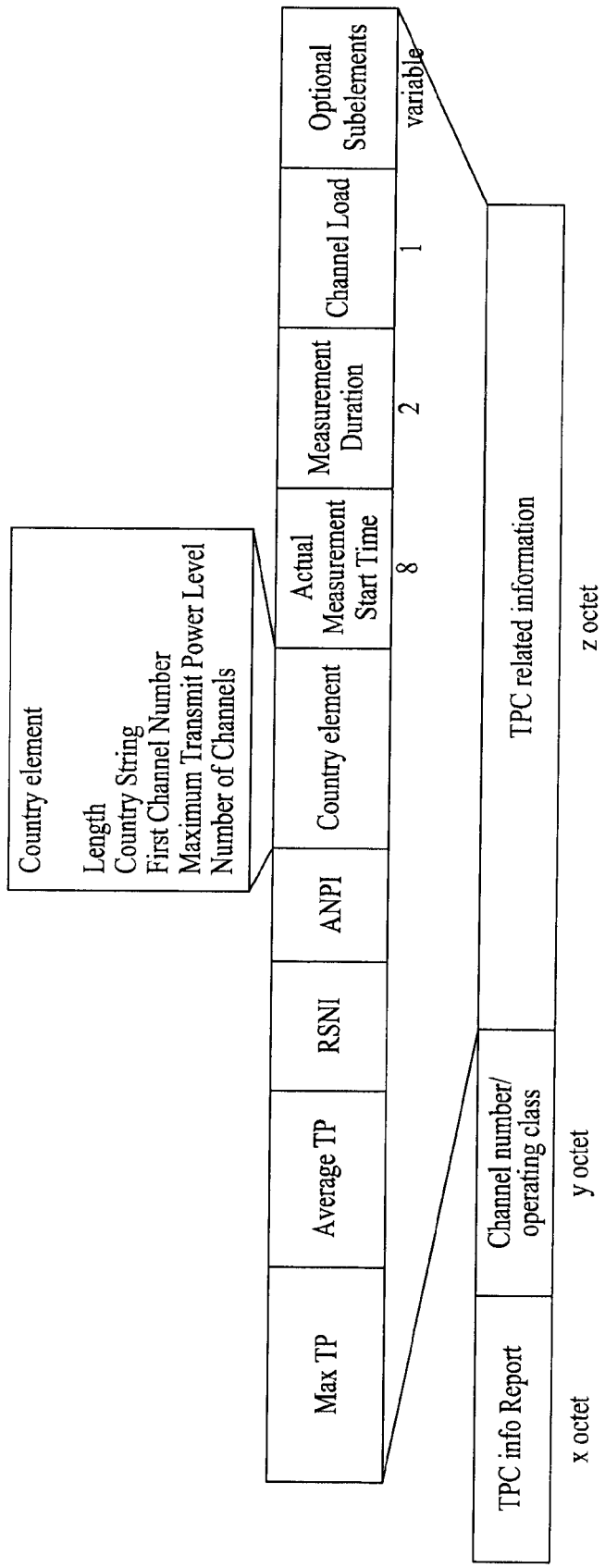
FIG. 17 is a conceptual diagram illustrating an example of TPC information report message format.

FIG. 17 is a conceptual diagram illustrating an example of TPC information report message format.

Referring to FIG. 17, if the AP receives the TPC_info_request message, the AP may transmit only the requested information.

AP channel list and the following information associated with each channel may be transmitted through the TPC_info_report message. The operating class, channel number, regulatory maximum transmit power of a channel, or current maximum transmit power information may be contained in the TPC_info_report message, so that the resultant TPC_info_report message may be transmitted. Alternatively, the TPC_info_report message may include the country element field. The country element field may include Length, Country String, First Channel Number, Maximum Transmit Power Level, and Number of Channels.

The TPC_info_report message may include a current transmit power (i.e., an average value during a specific time) of a channel. In addition, the TPC_info_report message may include information regarding an interference signal value received from the neighbor BSS. For example, the TPC_info_report message may include an Average Noise Power Indicator (ANPI) field or a Received Signal to Noise Indicator (RSNI) field. ANPI may be an average noise plus interference power value measured during a measurement interval indicated when the indicated channel is idle, and may be denoted by $RSNI=(10 \times \log 10((RCPI_{power}-ANPI_{power})/ANPI_{power})+10)\times 2$. Here, RCPI may be a total channel power including signal, noise, and interference. RSNI may be an average value of RSNI measured during a predetermined time. In addition, the TPC_info_report message may further include channel load status information.

Thereafter, the AP may periodically triggered or event-triggered according to the received TPC information request message, and may transmit the TPC_info_report message to the IWE in step S435.

IWE may transmit a TPC command message for indicating that (max) transmit power of the corresponding APs will be adjusted to lower/upper values on the basis of at least one of TPC information received from the AP and the legacy AP information in step S440. The TPC command message may include AP channel information, operating class of the channel, channel number, etc. In addition, the TPC command message may include a regulatory maximum Tx power indicator of each channel, so that the resultant TPC command message may be transmitted. The TPC command message may indicate (or may indicate a relative value) that Tx power will be controlled down or up on the basis of current regulatory maximum Tx power of the AP, or may transmit the regulatory maximum Tx power value (indicating an absolute value). In this case, the maximum Tx power transmitted from the corresponding IWE may be identical to or less than the regulatory maximum Tx power of the AP channel. That is, the maximum Tx power must not be higher than the regulatory maximum Tx power of the AP channel. An exemplary method for representing the maximum Tx power indicator will hereinafter be described in detail.

Example 1

Transmission of Relative Value

Method 1: If a reference value of a relative transmit power level is a regulatory maximum Tx power of the AP, the up/down dB value compared to the regulatory maximum Tx power is transmitted (e.g., −3, −2, −1, 0, 1, 2, 3 dB)

Method 2: If a reference value of a relative Tx power level is a current maximum Tx power of the AP, the up/down dB value compared to the maximum Tx power is transmitted (e.g., −3, −2, −1, 0, 1, 2, 3 dB).

Method 3: In Method 3, bitmap is used. If the bitmap is set to zero '0', this means that power is controlled down by one step (i.e., 1-step-down). If the bitmap is set to '1', this means that power is controlled up by one step (i.e., 1-step-up). In this case, it is assumed that a power value of 1 step is configured. For example, a 1-step unit is set to 3 dBm. If the power value is set to zero, this means that the 1-step unit is set to 3 dBm. If the power value is set to '1', this means that 1-step unit is set to +3 dBm. Otherwise, if the power value is set to zero '0', 1-step-up of power may be indicated. If the power value is set to '1', 1-step-down of power may be indicated.

Method 4: Method 4 indicates that n bits are used. For example, if 2 bits are exemplarily set to '00', power is controlled down by one step (i.e., 1-step-down). If 2 bits are set to '01', power is controlled down by two steps (i.e., 2-step-down). If 2 bits are set to '10', power is controlled up by one step (i.e., 1-step-up). If 2 bits are set to '11', power is controlled up by two steps (i.e., 2-step-up). (Here, it is assumed that a power value of 1 step is configured. For example, a 1-step unit is set to 3 dBm. If 2 bits are set to '00', the 1-step unit may be 3 dBm. If 2 bits are set to '01', the 1-step unit may be −6 Bm). On the contrary, if 2 bits are set to '11', power is controlled down by one step (i.e., 1-step-down). If 2 bits are set to '10', power is controlled down by two steps (i.e., 2-step-down). If 2 bits are set to '01', power is controlled up by one step (i.e., 1-step-up). If 2 bits are set to '10', power is controlled up by two steps (i.e., 2-step-up).

Example 2

Transmission of Absolute Value

Method 1: In Method 1, lower or upper maximum Tx power than either regulatory maximum Tx power or current maximum Tx power is transmitted.

Method 2: In Method 2, an absolute value of the maximum Tx power composed of n bits is transmitted. For example, if 2 bits are used, '00':25 dBm, '01':20 dBm, '10':15 dBm, and '11':10 dBm may be configured.

A situation for transmitting the TPC command message will hereinafter be described in detail.

Figure 18:
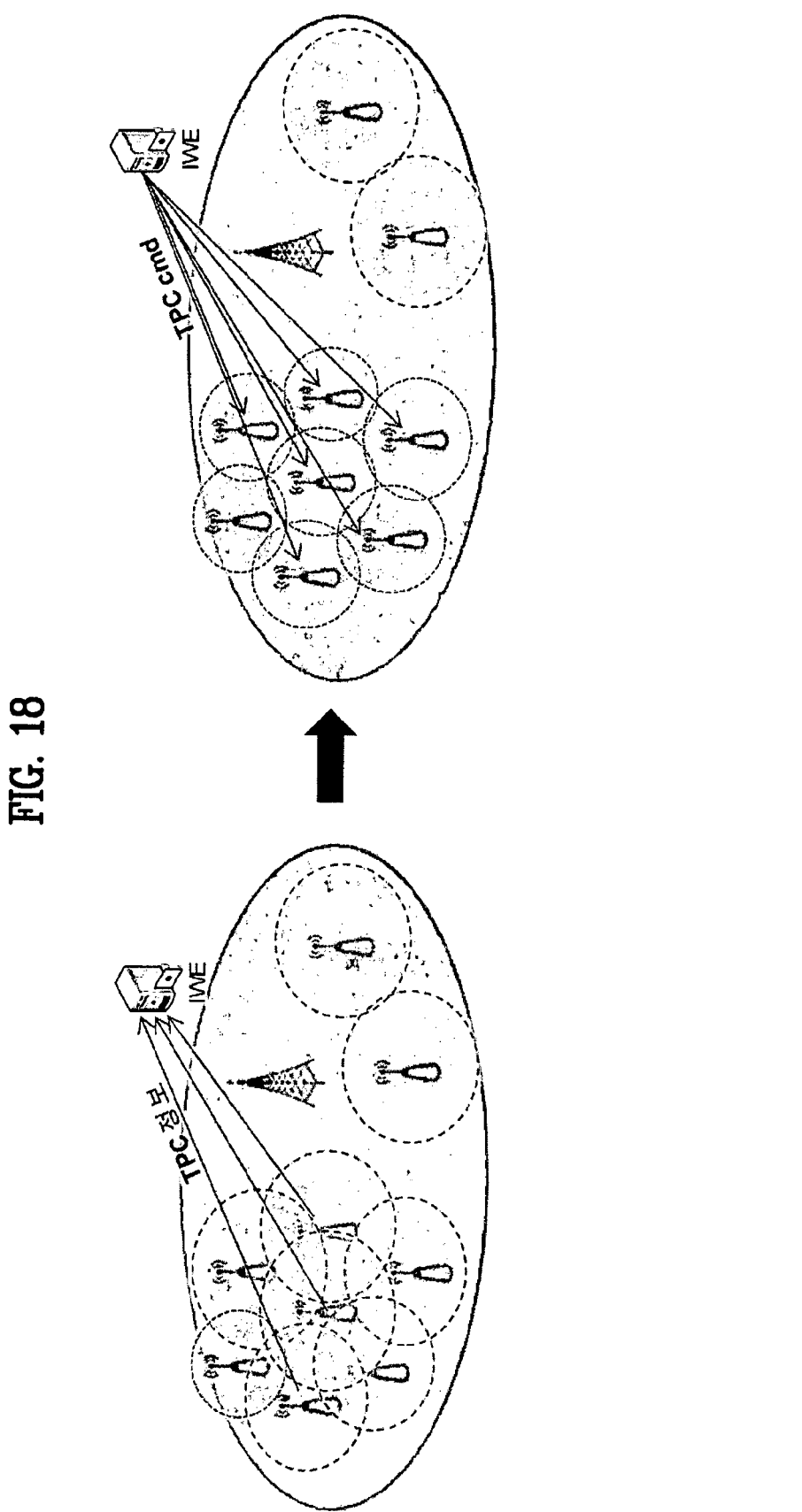
FIG. 18 is a conceptual diagram illustrating a first scenario for transmitting a TPC command message.

FIG. 18 is a conceptual diagram illustrating a first scenario for transmitting a TPC command message.

Referring to FIG. 18, a first scenario is an AP jamming situation. If a target region is a downtown area including many users, the number of installed APs is increased and the AP jamming situation may occur. Under the above-mentioned situation, interference may occur due to the presence of a neighbor AP. As the number of contiguous APs is gradually increased, WLAN performance may be gradually deteriorated. IWE defined by the present invention may determine the AP jamming situation according to the degree of interference signal value of TPC information received from the AP, and may adjust Tx power of the AP so as to minimize interference generated between APs. If interference occurs in such AP jamming situation, the TPC command message is transmitted to the corresponding APs so as to indicate reduction of AP maximum Tx power, so that the AP may perform Tx power control of the UE contained in a BSS thereof.

FIG. 19 is a conceptual diagram illustrating a second scenario for transmitting a TPC command message.

Referring to FIG. 19, the second scenario indicates an exemplary case in which the AP is turned off. If a specific AP is turned off according to various purposes (for example, interference mitigation, no user, entry to a night time, etc.), Tx power of the neighbor APs is increased, so that coverage of the turned-on AP can be extended. In accordance with the second scenario, it is assumed that the AP is turned off for IWE and the IWE manages the turned-off information.

In accordance with the third scenario, the AP may be turned on. If a specific AP is turned on due to various purposes (e.g., increased number of users or UEs, a delay time, etc.), Tx power of the neighbor APs is reduced so that coverage of the turned-on AP can be reduced. The third scenario may assume that the AP is turned on for IWE and the IWE manages the turned-on information.

Transmit Power Control Procedure of AP

Although Tx power of the AP used in IEEE 802.11 is decided by Transmit power Capability of STAs located below the AP and the regulatory Tx power of the AP, the present invention can control power of the AP and power of STAs contained in the BSS by referring to the regulatory Tx power and maximum Tx power value from the IWE.

First, the STA may transmit its own maximum/minimum power capability to the AP during association. Second, the AP may calculate local power constraint on the basis of maximum/minimum power performance of STAs. Third, the AP may transmit the next parameter through a beacon or probe response message.

Local Maximum Transmit Power (=Max Transmit Power−Local Power Constraint)

Max Transmit Power≤Maximum Tx power of Current Channel configured by IWE

Maximum Tx power of Current Channel configured by IWE≤Regulatory maximum Tx power STA's transmit power≤Local maximum Tx power AP's transmit power≤Maximum Tx power configured by IWE If the AP adjusts Tx power of the STA and the AP through the TPC in step S450, the measurement result of the adjusted Tx power is retransmitted to the IWE in step S460, so that the IWE may store the adjusted AP's TPC information. The TPC information report message may be transmitted through another format (e.g., TPC response message definition or it is indicated that the corresponding message contained in TPC information report is a message transmitted as the TPC procedure result, namely, a target field of Report may be added as necessary).

Figure 20:
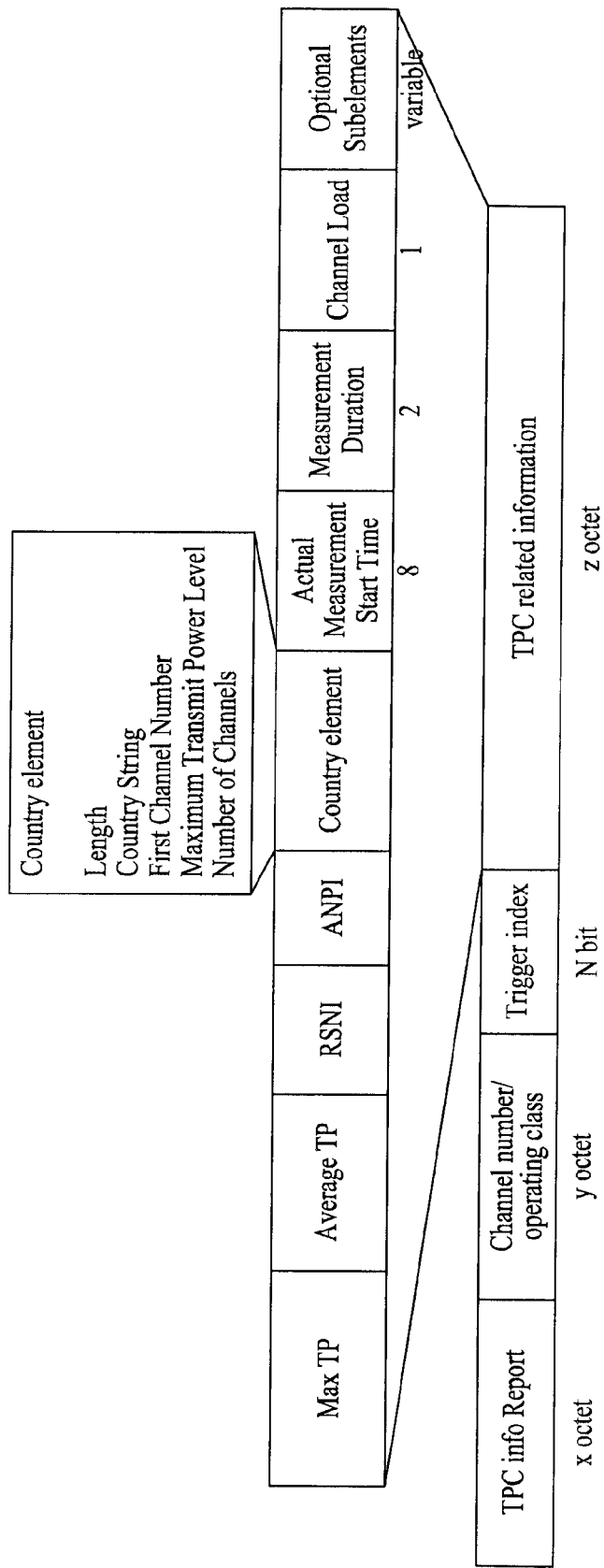
FIG. 20 is a conceptual diagram illustrating a TPC information report message format.

FIG. 20 is a conceptual diagram illustrating a TPC information report message format.

TPC_info_report message shown in FIG. 20 may further include a trigger index field in the TPC_info_report message shown in FIG. 17, such that the resultant message may be transmitted. The TPC_info_report trigger index field may indicate which condition is used for transmission of a report message. As an example of the trigger conditions, if interference of the neighbor AP is equal to or higher than a specific threshold value according to Index 1, if cell load of the neighbor AP is equal to or higher than a specific threshold value according to Index 2, and if cell load of the neighbor AP is equal to or less than a specific threshold value according to Index 3, (maximum) transmit power of the AP may be adjusted according to Index 4.

Exemplary embodiments described hereinbelow are combinations of elements and features of the present invention. The elements or features may be considered selective unless mentioned otherwise. Each element or feature may be practiced without being combined with other elements or features.

Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation f the appended claims and all changes within the equivalent scope of the invention are within the scope of the invention.

MODE FOR INVENTION

Various embodiments have been described in the best mode for carrying out the invention.

INDUSTRIAL APPLICABILITY

As is apparent from the above description, tightly-coupled interworking between the AP and the cellular network is provided according to the embodiments, the entity for managing interworking can more efficiently control interference mitigation between APs and power saving of each AP under the AP jamming situation, resulting in increased system efficiency. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for performing transmit power control (TPC) in a convergence network of a plurality of communication systems, the method comprising:
receiving, by a first entity of a first communication system, a TPC information request message requesting information associated with transmit power control (TPC) from a second entity of a second communication system;
upon receiving a request of the TPC information request message, transmitting a first TPC information reporting message, which includes a maximum transmit (Tx) power value of the first entity and an interference signal value caused by a neighbor entity of the first entity, to the second entity;
receiving a TPC command message, which includes information of maximum Tx power value of the first entity adjusted based on the maximum Tx power value of the first entity and the interference signal value, from the second entity; and
adjusting the maximum Tx power value of the first entity based on the information regarding the adjusted maximum Tx power of the first entity.

2. The method according to claim 1, further comprising:
transmitting a message including information regarding a UE local maximum transmit (Tx) power value decided based on the adjusted maximum Tx power value of the first entity to the user equipment (UE).

3. The method according to claim 1, wherein the TPC information request information message includes information indicating event-triggered reporting according to periodic reporting of the TPC information or according to satisfaction of a triggering condition.

4. The method according to claim 3, wherein the triggering condition includes one case in which the interference signal value caused by the neighbor entity is equal to or higher/less than a specific threshold value, or another case in which load of a cell including the first entity is equal to or higher/less than a specific threshold value.

5. The method according to claim 1, wherein the maximum transmit (Tx) power value of the first entity is a maximum Tx power value specified for the first entity or a maximum Tx power value currently configured in the first entity.

6. The method according to claim 1, further comprising:
transmitting a second TPC information reporting message including information of the adjusted maximum Tx power value of the first entity to the second entity.

7. The method according to claim 1, wherein:
if the interference signal value caused by the neighbor entity of the first entity is equal to or higher than a predetermined threshold value, the adjusted maximum Tx power value of the first entity is controlled to be lower than the first-entity maximum Tx power value contained in the first TPC information reporting message.

8. The method according to claim 1, wherein:
if the interference signal value caused by the neighbor entity of the first entity is less than a predetermined threshold value, the adjusted maximum Tx power value of the first entity is controlled to be higher than the first-entity maximum Tx power value contained in the first TPC information reporting message.

9. The method according to claim 1, wherein the first communication system is a WLAN system, the first entity is an access point (AP), the second communication system is a cellular communication system, and the second entity is a base station (BS), a Mobility Management Entity (MME), or an Interworking Management Entity (IWME).

10. A first entity of a first communication system configured to perform transmit power control (TPC) in a convergence network of a plurality of communication systems, comprising:
a receiver configured to receive a TPC information request message requesting information associated with transmit power control (TPC) from a second entity of a second communication system;
a transmitter, upon receiving a request of the TPC information request message, configured to transmit a first TPC information reporting message, which includes a maximum transmit (Tx) power value of the first entity and an interference signal value caused by a peripheral entity of the first entity, to the second entity,
wherein the receiver is configured to receive a TPC command message including information of maximum Tx power value of the first entity adjusted based on the maximum Tx power value of the first entity and the interference signal value, from the second entity; and
a processor configured to adjust the maximum Tx power value of the first entity based on the information regarding the adjusted maximum Tx power of the first entity.

11. The first entity according to claim 10, wherein the transmitter is configured to transmit a message including information regarding a UE local maximum transmit (Tx) power value decided on the basis of the adjusted maximum Tx power value of the first entity to the user equipment (UE).

12. The first entity according to claim 10, wherein the TPC information request information message includes information indicating event-triggered reporting according to periodic reporting of the TPC information or according to satisfaction of a triggering condition.

13. The first entity according to claim 10, wherein the transmitter is configured to transmit a second TPC information reporting message including information of the adjusted maximum Tx power value of the first entity to the second entity.

* * * * *